UNITED STATES PATENT OFFICE.

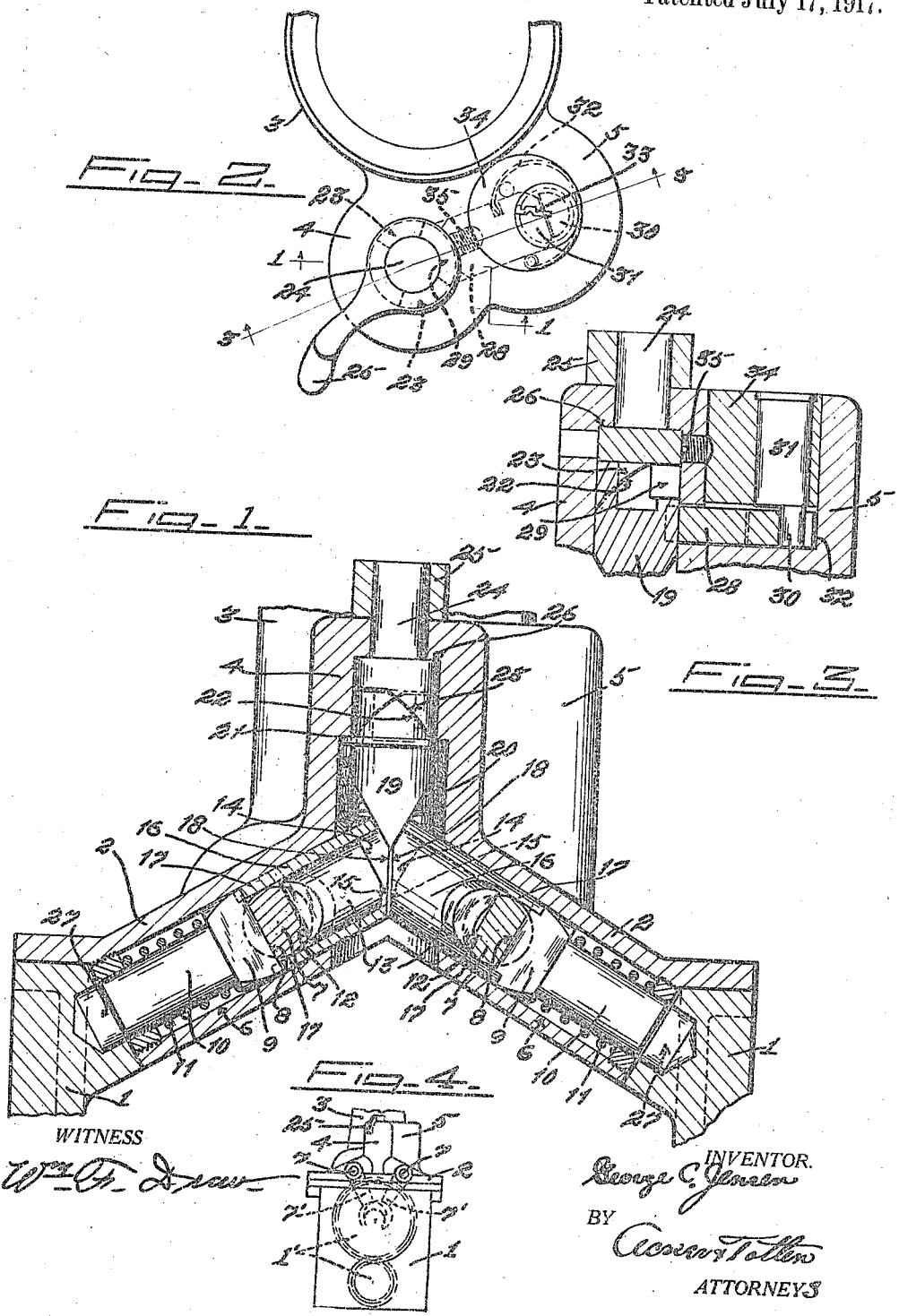

GEORGE C. JENSEN, OF OAKLAND, CALIFORNIA.

GEAR-SHIFT LOCK FOR MOTOR-VEHICLES.

1,233,788.  Specification of Letters Patent.  Patented July 17, 1917.

Application filed January 3, 1917. Serial No. 140,473.

*To all whom it may concern:*

Be it known that GEORGE C. JENSEN, a citizen of the United States, residing at Oakland, in the county of Alameda and State of California, have invented certain new and useful Improvements in Gear-Shift Locks for Motor-Vehicles, of which the following is a specification.

The present invention relates to a device for locking the gear-shifting mechanism of motor vehicles, to prevent the engagement of the power-transmitting gears, and by so doing to prevent theft or unauthorized use of the vehicle.

It is common practice, in the construction of motor vehicles, to mount the gear-shifting mechanism in the upper portion or cover of the case inclosing the gears, and said shifting mechanism comprises two or more parallel lineally movable rods, set parallel with the shafts of the gears, and connected with the axially movable gears by means of suitable yokes, said shifting rods being operated by a suitable selecting lever or other mechanism. In such construction, even if the selecting lever or mechanism be locked against operative movement, it is a comparatively simple matter for anyone familiar with motor vehicles to remove the cover of the gear case, thereby exposing either the shifting mechanism or the gears themselves, or both, and to move said gears into driving relation by hand or with the aid of a bar or similar tool.

The object of the present invention, therefore, is to provide a simple and practicable device for locking the shifting mechanism in its neutral or inoperative position, and for simultaneously locking the cover of the gear case fast to the body of said case, and thereby to effectually prevent any tampering with the power-transmitting gears. Said gears being locked in their neutral position, the vehicle can not be moved under its own power, and therefore cannot be stolen or operated by unauthorized persons, although it may be moved about by hand, as from place to place in a garage or repair shop.

With these and other objects in view, the invention comprises the novel combination of parts hereinafter described, illustrated in the accompanying drawings, and pointed out in the claims hereto appended, it being understood that changes in form and construction, within the scope of the claims, may be made without departing from the spirit of the invention or sacrificing any of the advantages thereof.

In order to comprehend the invention, reference should be had to the accompanying drawings, wherein:

Figure 1 is a part-sectional elevation showing a portion of a motor vehicle gear case and the cover therefor, the shifting mechanism mounted within said cover, and my locking device associated therewith, the section being taken in the direction of the arrows on the line 1—1 of Fig. 2.

Fig. 2 is a plan view of a portion of the gear-case cover and my locking device incorporated therewith.

Fig. 3 is a sectional detail of the locking device, taken in the direction of the arrows on the line 3—3 of Fig. 2.

Fig. 4 is an end elevation of the complete gear case with my lock applied thereto the variable speed gearing being shown in dotted lines.

In the drawings, the reference numeral 1 designates a case or housing for inclosing the variable speed power-transmitting mechanism of a motor vehicle, said mechanism being indicated at 1′ in Fig. 4. It is understood that the case 1 and the mechanism 1′ contained therein may be of any well known type used upon motor vehicles, as for example a sliding gear set. The numeral 2 designates the cover for said case 1, which is understood to be secured thereto in any manner not illustrated. The cover 2 is shown in Fig. 1 as formed with a cylindrical vertical extension 3 adapted to provide a support, in any well known manner, for the selecting lever, not illustrated, and with vertical cylindrical extensions 4 and 5, adjacent to the extension 3 for inclosing the locking devices.

The lower portion of said cover is inverted V-shaped, as shown, and is provided with inclined transversely disposed cylindrical channels or bores 6, whose apex or meeting point lies at the bottom of the vertical extension 4. The lineally movable parallel shifting rods 7, which are understood to be mounted in the usual manner in said cover 2 and connected, in any well known manner not illustrated, with the selecting lever and with the shiftable gears 1' by yokes 7', Fig. 4, so that the gears are shifted into operative position by the lineal movement of said rods, such being the usual construction of devices of this type, pass through the transverse inclined channels 6 perpendicularly to the axes thereof.

The shifting rods 7 are formed, on their lower sides with transverse V-shaped notches 8, said notches lying within the channels 6 when said rods are in their neutral positions, and being engaged by the V-shaped heads 9 of plungers 10 slidably mounted in the lower ends of said channels and pressed in engagement with said rods by springs 11. The function of said plungers is to accurately locate the rods 7 in the proper positions, and to prevent the same from moving out of said positions except when properly actuated. It is understood that other similar notches, not shown, are provided, there being one for each operative position of each rod, in addition to the neutral notches illustrated.

Each shifting rod 7 is also provided, on its upper side, with a V shaped notch 12 positioned opposite the lower neutral notch 8 said upper notch 12 being engaged, when the rod is in its neutral position, by the V-shaped end of a slidably mounted plunger 13, lying within the upper portion of the channel 6. The upper ends of said plungers 13 are formed each with a transverse face 14 and a beveled face 15, and when both of said plungers are in engagement with the notches 12 in the shifting rods 7, that is when both of said rods are in neutral position, the beveled faces 15 are slightly spaced, as shown in Fig. 1 of the drawings; but when one of said rods 7 is moved out of its neutral position, the plunger 13 associated therewith is raised out of the notch 12 and moved sufficiently to cause its upper beveled face 15 to come into contact with the beveled face 15 of the other plunger 13, thereby preventing the upward movement of said other plunger and also preventing the movement of the shifting rod 7 associated therewith, by retaining said plunger 13 in its notch 12. Thus when one of the shifting rods 7 is moved out of its neutral position, the other shifting rod is sufficiently locked in its neutral position. This, as will readily be understood, is for the purpose of preventing the simultaneous engagement of two or more sets of driving gears.

The plungers 13 are surrounded, within the upper ends of the channels 6, by cylindrical sleeves 16, whose lower ends are forked, as at 17, to straddle the shifting rods 7, and extended to bear against the heads 9 of the lower plungers 10. The upper ends of said sleeves are beveled, as at 18, for nearly their entire width, and lie close together, as shown, when said lower plungers 10 are seated within their respective notches in the rods 7. The sleeves 16 are independent in their movements of the upper plungers 13. A vertically movable V-shaped spreader block 19 is slidably mounted within the cover extension 4, and is normally retained in its uppermost position, with its edge resting between the upper ends of the sleeves 16, as shown in Fig. 1, by a spring 20 acting against a flange 21 on said block. The upper end of said block 19 is formed with cam faces 22, Figs. 1 and 3, which are adapted to be engaged by similar cam faces 23 formed upon the lower end of a rotatable spindle 24, whose upper end projects above the cover extension 4, and is provided with an operating lever or handle 25, Figs. 1, 2 and 3. A shoulder 26 upon said spindle takes the thrust reaction of said cam faces. By the partial rotation of the spindle 24 the block 19 is moved downward, and entering between the upper ends of the sleeves 16, forces said sleeves downward within their respective channels, and finally seats between the transverse upper ends 14 of the upper plungers 13, thereby securely retaining the lower ends of said plungers within their respective notches in the shifting rods 7. Said rods are thus locked against movement. At the same time, the lower plungers 10 are moved downward by the engagement of the forked lower ends 17 of said sleeves with the heads 7 of said lower plungers, and the lower ends of said plungers are caused to engage recesses 27 formed in the body 1 of the gear case, so that the cover 2 is securely locked to said case 1. Thus by the movement of the operating lever 25, the shifting rods 7 are locked against movement, and the cover 2 is locked to the case 1. It will be seen, moreover, that if either of the shifting rods 7 be moved out of its neutral position, the lower plunger 10 associated therewith will be depressed, and its lower end caused to enter the recess 27 in the case 1, so that under these conditions the cover 2 is automatically locked to said case 1.

For retaining the block 19 in its lower, or locking position, there is provided a laterally slidable bolt 28, Figs. 2 and 3 of the drawings, whose inner end is adapted to engage a notch 29 formed in the upper surface of said block, and whose outer end lies at the bottom of a cylindrical chamber formed in the cover extension 5, and is adapted to be engaged by an eccentric lug 30 carried by the lower end of a key controlled lock cylinder 31. A spring 32 normally retains said bolt out of engagement with the block 19. The lock 31 may be of any desired type, and is herewith shown as a cylinder lock having a key slot 33, Fig. 2. Said lock is rotatably mounted in a bushing 34 set into the extension 5 and retained therein by a set screw 35.

To lock the shifting rods 7 and the gear case cover 2, the lever 25 is first moved and then the lock 31 is operated by means of its key, not shown, to shoot the bolt into the notch 29. The opposite movements unlock the device, as will be readily understood.

Having thus described my invention, what I claim is:

1. The combination with a variable speed power transmitting mechanism, a case inclosing the same, a removable cover for said case, and mechanism for shifting the movable members of said variable speed mechanism; of means for locking said shifting mechanism against operative movement; and associated devices for locking said cover to prevent its removal from said case.

2. The combination with a variable speed power transmitting mechanism, a case inclosing the same, a removable cover for said case, and mechanism for shifting the movable members of said variable speed mechanism; of means contained within said cover for locking said shifting mechanism against operative movement and for simultaneously locking said cover to prevent its removal from said case.

3. The combination with a variable speed power transmitting mechanism, a case inclosing the same, a removable cover for said case, and mechanism for shifting the movable members of said variable speed mechanism; of means for controlling operative movement of said shifting mechanism and for simultaneously preventing the removal of said cover from said case.

4. The combination with a variable speed power transmitting mechanism, a case inclosing the same, a removable cover for said case, and mechanism for shifting the movable members of said variable speed mechanism; of means for preventing operative movement of said shifting mechanism and for preventing the removal of said cover from said case; and lock controlled devices for retaining said means in operative position.

5. The combination with a variable speed power transmitting mechanism, a case inclosing the same, a removable cover for said case, and mechanism for shifting the movable members of said variable speed mechanism; of means associated with said shifting mechanism for locking said cover to prevent its removal from said case.

6. The combination with a variable speed power transmitting mechanism, and a pair of lineally movable rods for shifting the movable members thereof; of devices actuated by the movement of either one of said rods for preventing movement of the other rod; and a lock controlled means associated with said devices for locking said rods against operative movement.

7. The combination with a variable speed power transmitting mechanism, and a pair of lineally movable rods for shifting the movable members thereof; of a pair of interlocking plungers actuated by the movement of either one of said rods to prevent movement of the other rod, and lock controlled means for actuating said plungers to lock said rods against operative movement.

8. The combination with a variable speed power transmitting mechanism, a case inclosing the same, a removable cover for said case, and a lineally movable rod for shifting the movable members of said mechanism; of a movable member adapted to engage said rod to prevent movement thereof, and a second movable member adapted to lock said cover to said case.

9. The combination with a variable speed power transmitting mechanism, a case inclosing the same, a removable cover for said case, and a lineally movable rod for shifting the movable members of said mechanism; of a movable plunger associated with said cover and adapted to engage said rod to retain the same in its operative position; a second movable plunger adapted to engage said rod to lock the same against movement and to co-act with the first mentioned plunger to cause the same to engage said case to prevent the removal of said cover; and lock controlled devices for actuating the second mentioned plunger.

10. The combination with a variable speed power transmitting mechanism, a case inclosing the same, a removable cover for said case, and a pair of lineally movable rods for shifting the movable members of said mechanism; of a pair of movable plungers associated with the cover and adapted to engage said rods to retain the same in their operative positions; a second pair of inter-locking plungers associated with said rods and adapted to be actuated by the movement of either one of said rods to prevent movement of the other rod; devices for actuating both of said inter-locking plungers to prevent operative movement of said rods, said devices coacting with the first mentioned retaining plungers to cause the same to engage the case to prevent the removal of the cover therefrom; and lock controlled means for retaining said devices in operative position.

11. The combination with a variable speed power transmitting mechanism, a case inclosing the same, a removable cover for said case, mechanism for shifting the movable members of said variable speed mechanism, of means capable of operation for locking said shifting mechanism against operative movement and for simultaneously and automatically locking said cover to prevent its removal from said case.

In testimony whereof I have signed my name to this specification in the presence of a subscribing witness.

GEORGE C. JENSEN.

Witness:
D. B. RICHARDS.